United States Patent [19]
DeSalvo

[11] Patent Number: 5,284,586
[45] Date of Patent: Feb. 8, 1994

[54] FLUID FLOW FILTER AND METHOD OF MAKING SAME

[75] Inventor: Thomas E. DeSalvo, St. Charles, Ill.

[73] Assignee: Eaton Corporation, Cleveland, Ohio

[21] Appl. No.: 49,219

[22] Filed: Apr. 19, 1993

[51] Int. Cl.⁵ .............................. B01D 27/08
[52] U.S. Cl. ...................... 210/448; 55/495; 55/497; 55/505; 55/511; 55/525; 210/459
[58] Field of Search ............... 55/491, 495, 497, 505, 55/511, 525; 210/416.4, 448, 449, 459, 461, 453

[56] References Cited
U.S. PATENT DOCUMENTS

| | | | |
|---|---|---|---|
| 2,800,977 | 7/1957 | Stewart | 55/505 X |
| 3,749,250 | 7/1973 | Oldford | 210/448 |
| 5,100,444 | 3/1992 | Meifitz et al. | 55/525 X |

*Primary Examiner*—Charles Hart
*Attorney, Agent, or Firm*—R. A. Johnston

[57] ABSTRACT

A wire mesh filter screen has a flat disc shape and is seated on a flat bottom counterbore in a threaded fitting. A circular knife edged punch pierces a ring of material from the counterbore wall surrounding the disc periphery. A second flat punch axially deforms the ring over the disc periphery to securely retain the screen in the fitting.

6 Claims, 1 Drawing Sheet

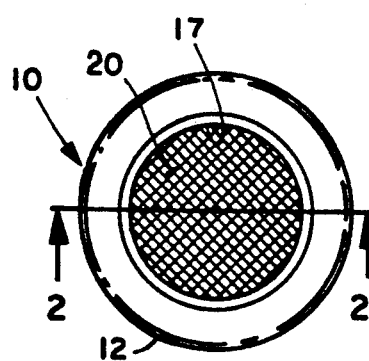
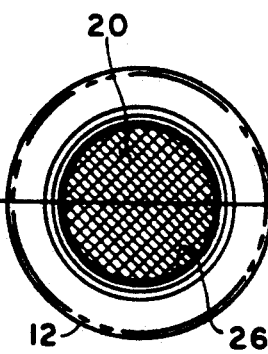
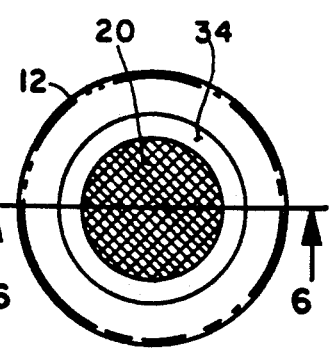
FIG. 1     FIG. 3     FIG. 5
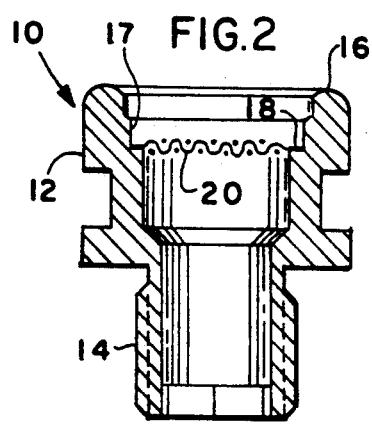
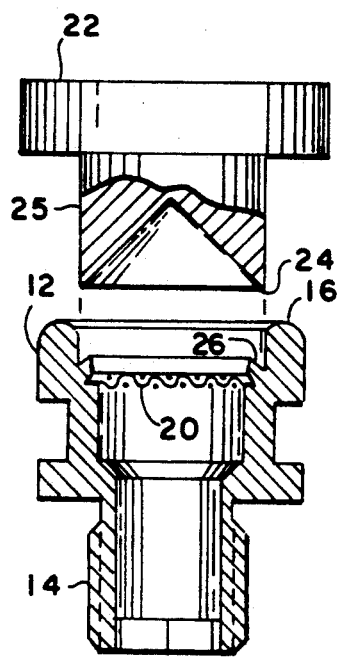
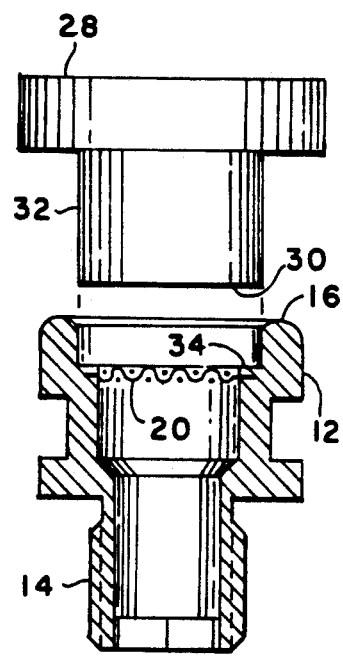
FIG. 2     FIG. 4     FIG. 6
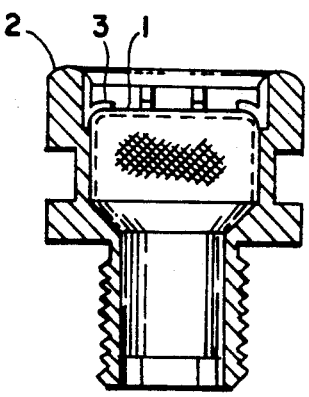
FIG. 7    PRIOR ART

FLUID FLOW FILTER AND METHOD OF MAKING SAME

BACKGROUND OF THE INVENTION

The present invention relates to fluid flow filters, and particularly filters of the screen type which are inserted or assembled into a flow passage for filtering particles of a predetermined minimum size from entering the flow passage. The present invention relates particularly to filtering particles from entering the flow port of a gas valve, for example the type of valve employed for controlling flow of fuel gas to a burner.

Fuel burner gas valves commonly employ a very fine mesh wire screen in the flow port thereof to prevent foreign particles from entering the valve and becoming lodged on the valve seat to prevent sealing of a valve member thereon and corresponding leakage. In providing filter screens in the flow passage for gaseous fluid, problems have been encountered in installing and securing the screen in such a manner as to prevent easy removal of the screen. Heretofore, it has been common practice to form the screen into a cupped configuration with a rolled edge which may then be pressed with an interference fit on the rolled edge into the outlet port of the valve. However, this procedure can result in small slivers of metallic material entering the valve during the screen installation and becoming lodged between the resilient valve member and the valve seat, thereby causing leakage. With reference to FIG. 7 of the drawings, it has also been known to provide a cupped filter screen, and to retain the screen by reversing and deforming metal tabs over the cupped end to prevent removal of the screen. However, neither of the aforesaid known techniques of screen installation have been proven to be sufficiently tamper resistant as to prevent ready removal of the screen when clogged.

SUMMARY OF THE INVENTION

The present invention provides a flat disc of screen wire which is securely retained about its entire circumference against a flat annular surface provided in an adaptor fitting for attachment in a fluid conduit or flow passage. The screen is retained by initially piercing or punching material in the fitting wall surrounding the flat annular surface to form a ring of material about the periphery of the screen disc. A flat punch is then driven axially onto the ring of the material which is deformed axially over the periphery of the screen to retain the screen continuously about the periphery thereof.

In the preferred embodiment, the fitting into which the screen is mounted has a valve seat surrounding the screen such that the screen is mounted to the fitting as a subassembly prior to installation in a valve.

BRIEF DESCRIPTION OF THE DRAWINGS

FIG. 1 is an end view of the fitting of the present invention with the screen initially installed;

FIG. 2 is a section view, taken along section-indicating lines 2—2 of FIG. 1;

FIG. 3 is a view similar to FIG. 1, showing the first stage of piercing or punching;

FIG. 4 is a section view, taken along section-indicating lines 4—4 of FIG. 3;

FIG. 5 is a view similar to FIG. 3, illustrating the completed filter assembly of the present invention;

FIG. 6 is a section view, taken along section-indicating lines 6—6 of FIG. 5; and, FIG. 7 is a view similar to FIG. 2, of the known device.

DETAILED DESCRIPTION

Referring to FIGS. 1 and 2, the filter screen assembly is indicated generally at 10 as having a body denoted by reference numeral 12 having a generally elongated annular configuration, and which has at one end thereof certain surfaces comprising threads 14 in the illustrated embodiment adapted for attachment to a fluid conduit or valve.

It will be understood that the threads 14 are adapted for mounting the fitting body 12 with valve seat 16 in the outlet of a valve such as a valve for controlling flow to a gaseous fuel burner. However, the illustrated configuration of fitting 12 is intended as representative only. Other configurations for the fitting may be employed; and, it will be understood that the valve seat 16 can be omitted. Also, it will be understood that the exterior configuration of the body 12 may be varied to suit the particular circumstances of the conduit or flow passage into which the screen subassembly is to be installed.

The body 12 has formed at one end thereof a smooth annular valve seating surface 16. A counterbore 17 is formed in the upper or valve seat end of body 12 and has a flat bottom which forms a generally flat planar surface 18. Surface 18 has registered thereagainst a flat, disc-like screen member 20 preferably formed of woven wire mesh which is seated circumferentially on the surface 18 about its periphery.

Referring to FIGS. 3 and 4, an annular piercing tool or punch 22 is illustrated as having a recess formed in the end thereof to provide a tapered circumferential knife edge 24, which has the outer cylindrical surface thereof formed to a diameter which is a desired amount greater than that of the counterbore 17. Punch 22 is driven axially into the body 12, as indicated by the dashed lines in FIG. 4 such that the knife edge 24 pierces or slices the material of the wall of counterbore 17 in the body 12 to form a ring of material denoted by reference numeral 26. Ring 26 extends at an angle radially inwardly over the periphery of screen 20. Punch 22 is then removed.

Referring to FIGS. 5 and 6, a second punch, denoted by reference numeral 28, is provided and is shown having a generally square or flat bottom 30, with a diameter 32 sized to have the same diameter as diameter 25 of the punch 22.

Referring to FIG. 6, punch 28 is driven axially into the fitting 12 until the flat bottom 30 thereof contacts ring 26 and deforms the ring further in an axial direction over the periphery of the screen 20 until the ring 26 has a flat configuration, as denoted by reference numeral 34; and, the punch is then removed, leaving the screen installation completed.

It will be understood that the technique described above with respect to FIGS. 1 through 6 provides for complete metal encapsulation of the outer periphery of the screen 20 in a manner which provides for improved and greater strength retention of the screen in the fitting to resist tampering and removal thereof. The construction shown and described provides for a simpler and lower cost construction of a filter screen for a conduit or port, as compared with the cup-shaped screens utilized heretofore.

It will be understood that the invention, although described hereinabove with respect to the illustrated embodiments, is capable of modification and variation, and is limited only by the following claims.

I claim:

1. A method of installing a fluid flow filter screen comprising:
    (a) providing an annular mounting member formed of metallic material and forming an annular planar surface thereon;
    (b) providing a flat disc of woven screen material and disposing said disc on said planar surface;
    (c) piercing a ring of said metallic material about the periphery of said planar surface; and,
    (d) deforming said ring radially over the periphery of said disc and securing said disc on said planar surface.

2. The method defined in claim 1, wherein said step of piercing includes the piercing of a continuous ring of metallic material.

3. The method defined in claim 1, wherein said step of deforming including providing a flat surfaced punch and axially punching said ring.

4. A filtering assembly for insertion in a fluid flow conduit comprising:
    (a) body means having a generally elongated annular configuration and having certain surfaces in the region of one end thereof which surfaces are adapted for being sealingly attached in said flow conduit, said body means defining a flow passage therethrough with a generally planar annular surface formed therein;
    (b) a flat screen formed of woven mesh and seated on said flat annular surface; and,
    (c) a ring pierced or punched in said metallic material adjacent said planar annular surface, said ring deformed inwardly over the periphery of said screen for securing said screen on said planar surface.

5. The assembly defined in claim 1, wherein said certain surfaces includes threaded surfaces.

6. The assembly defined in claim 1, wherein said screen has a circular configuration.

* * * * *